United States Patent Office 3,334,549
Patented Aug. 8, 1967

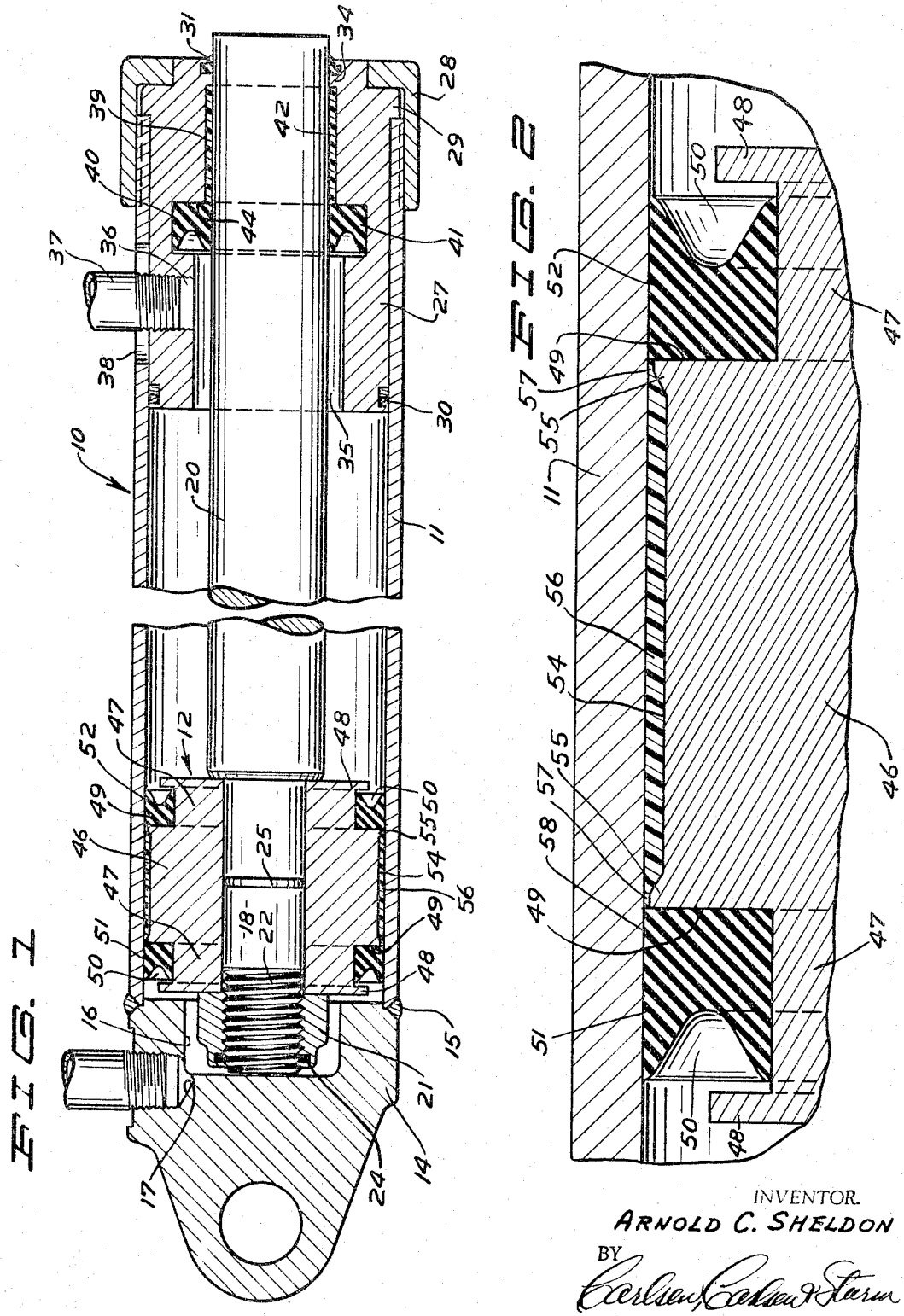

3,334,549
HYDRAULIC LINEAL ACTUATOR
Arnold C. Sheldon, 1187 Raymond Ave.,
St. Paul, Minn. 55108
Filed July 24, 1964, Ser. No. 384,902
4 Claims. (Cl. 92—248)

This invention relates generally to lineal hydraulic jacks or actuators and particularly concerns improvements in the interrelationship between the jack piston and cylinder.

In lineal actuators used in hydraulic systems it is desirable to provide an effective seal between the piston and cylinder wall to prohibit fluid leakage past the piston. Such seals have now been perfected to the point where all such leakage is eliminated. While such efficiency is desirable, an additional problem is created in that the piston is caused to run dry with no lubrication (formerly supplied by slight leakage) between it and the wall of the cylinder, causing undue wear and binding. Attempts to solve this problem have taken the form of mounting a wear strip of plastic bearing material around the circumferential periphery of the piston. Such attempts, however, have not been satisfactory in that the strip mountings have been such as to leave open areas around the piston at the sides of the strip into which the annular seals might extrude with resultant gradual deterioration and eventual ineffectiveness of the seals themselves.

With this problem in mind the primary object of the present invention is to provide a hydraulic jack or actuator in which the piston member is provided with liquid tight recessed end seals and a peripheral covering between the recesses which allows smooth non-wearing operation of the piston without significant deterioration or deformation of the seals.

Another object of the invention is to provide an actuator piston with a peripheral layer of plastic bearing material which will not be pushed back or wear excessively along the piston edges during piston operation.

Still another object of the invention is to provide a new and improved method of applying a non-lubricated plastic bearing material to the circumferential surface of a hydraulic actuator member having an end seal chamber in such a manner as to leave the chamber square so that the seals will not tend to extrude over the end edges of the piston into the space between the piston and cylinder.

With the above mentioned objects in view, the invention broadly comprises the bonding of a plastic material having a low coefficient of friction on the circumferential surface of a piston in a hydraulic actuator or jack to thereby reduce the wear on the cylinder walls and enable the sealing or packing rings on the piston head to maintain their effectiveness for a longer period of time. The invention is further characterized by grinding the edges of the plastic material to absolute evenness with the packing recess walls to further prevent deterioration of the packing.

The aforementioned objects of the invention will be brought to light during the course of the following specification, reference being made to the accompanying drawing, in which:

FIG. 1 is a sectional view through an actuator embodying the present invention with the view taken along the longitudinal axis of the actuator.

FIG. 2 is an enlarged detail fragmentary view of the actuator piston as shown in FIG. 1.

Referring now more particularly to the drawing, reference numerals will be used to denote like parts or structural features in the different views. The actuator denoted generally at 10 comprises a conventional cylinder or tube 11 which houses for telescopic sliding movement a piston denoted generally at 12. One end of the cylinder 11 is closed by a closure member 14 which is integrally secured to the cylinder as by a ring weld 15. The member 14 is provided with an inwardly opening axial recess 16 which connects with a port 17 through which fluid under pressure may be admitted to or discharged from the cylinder 11.

The piston 12, which will be later described in greater detail, is mounted on the reduced end portion 18 of a piston rod 20 and held thereon by an elastic stop-nut 21 which is screw threaded on the threaded end section 22 of rod portion 18. The nut 21 is provided with an internal groove for receiving a nylon ring 24 which serves an anti-loosening function by frictional engagement with the threads of section 22. Rod portion 18 has an external annular groove for receiving the O-ring 25. Rings 24 and 25 serve to prohibit leakage of fluid between the piston and rod.

At the opposite end of the cylinder 11 a packing and guide means for the piston rod 20 is provided. This includes a tubular insert sleeve 27 adapted to fit snugly in the end of the cylinder and a retainer cap 28 which is threaded on the outside of the cylinder, with both the sleeve and cap encircling the rod. Sleeve 27 is provided with an annular flange 29 which is held between cap 28 and the end of the cylinder 11 to lock the sleeve in place. The sleeve is provided with suitable grooves for receiving a sealing ring 30 and a wiper ring 31 respectively acting between the sleeve and cylinder and sleeve and rod.

The axial passage through the sleeve member 27 varies in diameter. Near its outer end the sleeve portion 34 closely encircles without normally contacting the rod 20 and seats the ring 31. The inner portion of the passage is enlarged to leave an annular chamber 35 around the rod 20. A radial port 36 is provided in this section of the sleeve and is internally threaded to receive an outlet connecting nipple 37 which extends outwardly through an aperture 38 in the cylinder 11. Between the sleeve portion 34 and the chamber 35 the sleeve passage has a bearing section 39 and an enlarged annular groove 40 which provides a seat for a sealing ring 41. The bearing section 39 is lined with an annular insert 42 of plastic dry bearing material such as Teflon which extends in an even thickness from the portion 34 to outer face 44 of the seat 40. In manufacturing the sleeve 27, the insert 42 is placed within the section 39 prior to the machining of the recess 40 so that the inner edge of the insert will be ground flush with the axially outer wall of the recess. The seal 41 holds the insert 42 against inward displacement.

The piston 12 will now be described in detail. The piston has an enlarged cylindrical central section 46 and diametrically reduced front and rear end sections 47. At each end the piston has a flange 48 which jointly with the periphery of section 47 and the adjacent end face 49 of the section 46 provides an annular seat or pocket 50 for holding the piston sealing rings, denoted respectively at 51 and 52, at each end of the piston. Rings 51 and 52 are U-shaped in cross section with the flat bight portion of each backing up against the adjacent piston end face 49. In other words, each ring opens away from the piston central section 46 so as to spread under external hydraulic pressure to perform an effective sliding seal between the piston 12 and cylinder 11. These seals are also preferably formed of polyurethane material.

The piston central section 46 has a diametrically reduced portion 54 extending between the axially spaced section end portions 55. The entire section 46 has its annular peripheral surface covered with a layer 56 of non-lubricated plastic bearing material such as Teflon. While the exterior diameter of the layer 56 is constant throughout its length, it will be obvious that the layer covering the reduced portion 54 will be somewhat thicker than that as at 57 over the section end portions 55. The end edges 58 of the layer 56 are formed to lie on the planes of the respective piston end surfaces 49.

The layer 56 may also be of nylon or Delrin or other relatively hard plastic resinous materials of the same general class having a low coefficient of friction. In applying a layer of Teflon the piston is heated to a temperature well above the Teflon melting point. The piston is then introduced into an enclosed chamber commonly referred to as a "fluidized bed" or "air bed" in which Teflon resinous particles are suspended in air. The particles will cling to the unmasked circumferential surface of the piston in a uniform layer and bond firmly thereto presenting a smooth outer surface as the piston is cooled. This process of bonding the material to the surface of a cast iron member is well known but is believed to be novel in the piston construction art.

After the piston has cooled, the outer surface of the plastic layer is milled to a smooth cylindrical form and the end edges adjacent the reduced thicknesses 57 are finished by grinding to the plane of the piston surfaces 49. Accordingly, the end faces 49 of the piston or the back to back walls of the pockets 50 and the layer edges 58 are perfectly flat and on a common plane at each end of the piston from the sections 47 to the cylinder 11. So formed there is no space between the piston and the cylinder into which the seals 51 and 52 can extrude during axial movement of the piston.

The layer 56 is preferably .010 to .015 of an inch in thickness for most efficient operation. It is found, however, that where the layer has such a thickness at the end edges, it will tend to be pushed axially inward by the pressures exerted by the seals 51 and 52 on such edges. However, where the edge thickness of the layer is reduced to .005 of an inch or less, there is insufficient room for the seals to enter between the piston and cylinder. This is accomplished here by providing diametrically enlarged end portions 55 on the piston immediately adjacent the end faces 49, leaving the layer edge portions 57 substantially thinner than the central portion of the layer 56. It is found that .003 to .005 of an inch thickness for the layer edge portions 57 is most effective.

The layer 42 may be of the same material as layer 56 and the inner edge thereof is preferably squared off with surface 44 to protect the sealing ring 41 in the same manner as just described for the rings 51 and 52.

It will be understood that the actuator 10 functions in conventional manner with hydraulic fluid entering the cylinder 11 through port 17 or port 36 to move the piston 12 and its connected rod 20 respectively to the right or to the left, as viewed in FIG. 1, to perform a desired work function. The sliding seals 51 and 52 will prevent fluid leakage past the piston and the layer 56 of plastic material bonded to the piston will allow smooth operation thereof with a minimum of wear while yet preserving the seals in effective condition. The invention may, of course, be utilized with equal effectiveness in a single acting jack where a seal, such as 51, is used at only one side of the piston.

The invention accordingly economically and effectively carries out the aforementioned objectives. It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In a hydraulic actuator including a piston member slidably fitted within a cylinder to be moved axially within the cylinder as hydraulic fluid is injected under pressure into the cylinder, said piston having annular recesses formed in its leading and trailing peripheral edges relative to the direction of movement, a pair of annular seals of polyurethane material disposed one in each recess to provide fluid-tight sealing engagement between the piston and cylinder, the peripheral annular surface of the piston between said recesses having a layer of non-lubricated plastic bearing material bonded thereto to cover the entire piston surface extending between said recesses, said layer having a uniform external diameter and a thickness of less than .005 of an inch facing toward and bordering on each recess.

2. The subject matter of claim 1 wherein the said surface is diametrically enlarged adjacent said recesses and said bearing material layer having said uniform diameter throughout the axial length of the piston between said recesses whereby said layer portion bordering on the recessed ends of the piston is thinner than the central portion thereof.

3. In a hydraulic actuator having a piston member slidably fitted within a tubular cylinder for axial movement therein under the pressure of hydraulic fluid, said piston having annular end recesses axially spaced on either side of a piston central section, each of said recesses being fitted with an annular sealing ring of polyurethane material to provide an effective circumferential fluid seal between the piston member and the interior wall of the cylinder, the piston central section having a circumferential peripheral surface, a layer of non-lubricated plastic bearing material having a relatively low coefficient of friction being bonded to said peripheral surface throughout its entire area, said layer having a thickness of at least .003 of an inch throughout and terminating at the piston edges bordering said recesses so as not to extend into said recesses.

4. The subject matter of claim 3 wherein said piston central section has a diametrically reduced portion extending between axially spaced end portions which border said recesses, and said layer covering said reduced portion having a thickness of at least .010 of an inch.

References Cited
UNITED STATES PATENTS

| | | | |
|---|---|---|---|
| 1,508,264 | 9/1924 | Armentrout | 92—250 X |
| 1,621,858 | 3/1927 | Sherwood | 92—249 X |
| 2,615,769 | 10/1952 | Barnes et al. | 92—252 X |
| 2,835,540 | 5/1958 | Jorgensen | 308—4 |
| 2,962,330 | 11/1960 | Kohl | 277—205 X |
| 2,982,590 | 5/1961 | Gunning | 277—205 X |
| 3,181,560 | 5/1965 | Worden et al. | 92—223 X |

MARTIN P. SCHWADRON, *Primary Examiner.*

I. C. COHEN, *Assistant Examiner.*